United States Patent [19]

Hwang

[11] Patent Number: 5,363,201
[45] Date of Patent: Nov. 8, 1994

[54] PICTURE CONTROL SYSTEM FOR VIDEO CASSETTE TAPE RECORDER

[75] Inventor: Jeong H. Hwang, Seoul, Rep. of Korea

[73] Assignee: Goldstar Co., Ltd., Seoul, Rep. of Korea

[21] Appl. No.: 785,100

[22] Filed: Oct. 30, 1991

[30] Foreign Application Priority Data

Oct. 30, 1990 [KR] Rep. of Korea ............... 17480/1990

[51] Int. Cl.$^5$ ............................................. H04N 5/95
[52] U.S. Cl. .................... 358/337; 348/625; 348/712; 360/36.1
[58] Field of Search ............... 358/335, 310, 336, 337, 358/340, 320, 325, 327, 328, 329, 330, 36, 37, 166, 167, 39, 162; 360/36.1, 37.1, 38.1; H04N 5/76, 5/78, 5/781, 5/782, 5/783, 9/79, 9/64, 5/14, 5/208, 5/94, 5/95, 5/91, 9/89

[56] References Cited

U.S. PATENT DOCUMENTS

| | | | |
|---|---|---|---|
| 4,731,660 | 3/1988 | Faroudja et al. | 358/36 |
| 4,748,499 | 5/1988 | Ueda | 358/36 |
| 4,766,487 | 8/1988 | Tanaka et al. | 358/36 |
| 4,779,133 | 10/1988 | Sugimori et al. | 358/36 |
| 4,931,743 | 6/1990 | Fukuda et al. | 358/36 |
| 5,047,840 | 9/1991 | Miki | 358/36 |
| 5,136,392 | 8/1992 | Ganse | 358/335 |

FOREIGN PATENT DOCUMENTS

| | | |
|---|---|---|
| 00475328 | 9/1981 | European Pat. Off. |
| 0077010 | 10/1982 | European Pat. Off. |
| 56-037782 | 4/1981 | Japan |
| 63-157573 | 6/1988 | Japan |
| 1238281 | 9/1989 | Japan |
| 2104336 | 3/1983 | United Kingdom |

Primary Examiner—Tommy P. Chin
Assistant Examiner—Thai Tran

[57] ABSTRACT

A picture control system for a video cassette tape recorder, capable of compensating edge portions of a reproduction luminance signal by obtaining a hard compensating signal by filtering a high-band component of the reproduction luminance signal, a soft compensating signal by filtering a low-band component of the delayed reproduction luminance signal, and selecting the hard compensating signal combining control signal and then subtracting from the delayed reproduction luminance signal. The system includes a picture control signal generator, a hard-controller for filtering a high-band component of reproduction luminance signal, a soft controller for filtering a low-band component of reproduction luminance signal, and a signal combiner for selecting the hard and soft compensating signals and combining the selected signal with the delayed reproduction luminance signal.

7 Claims, 6 Drawing Sheets

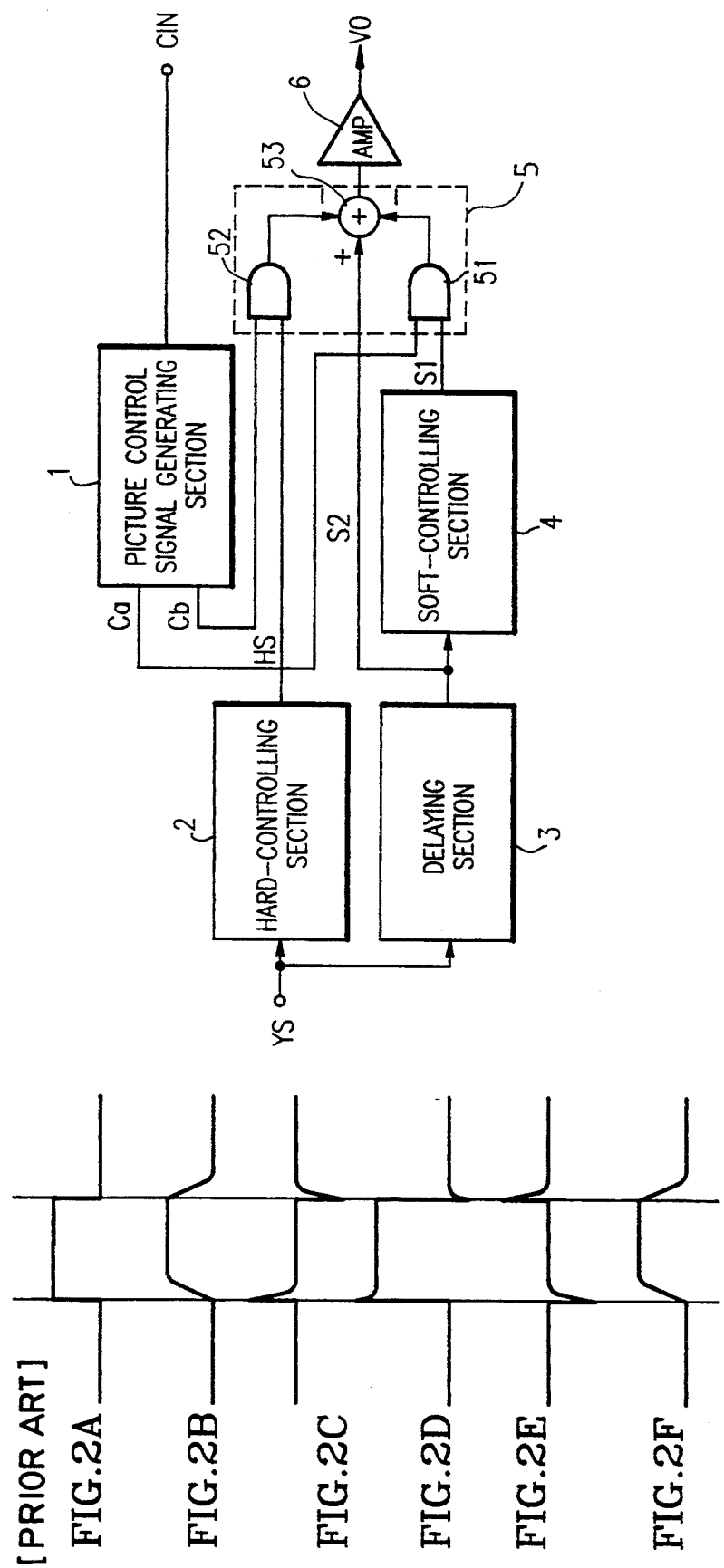

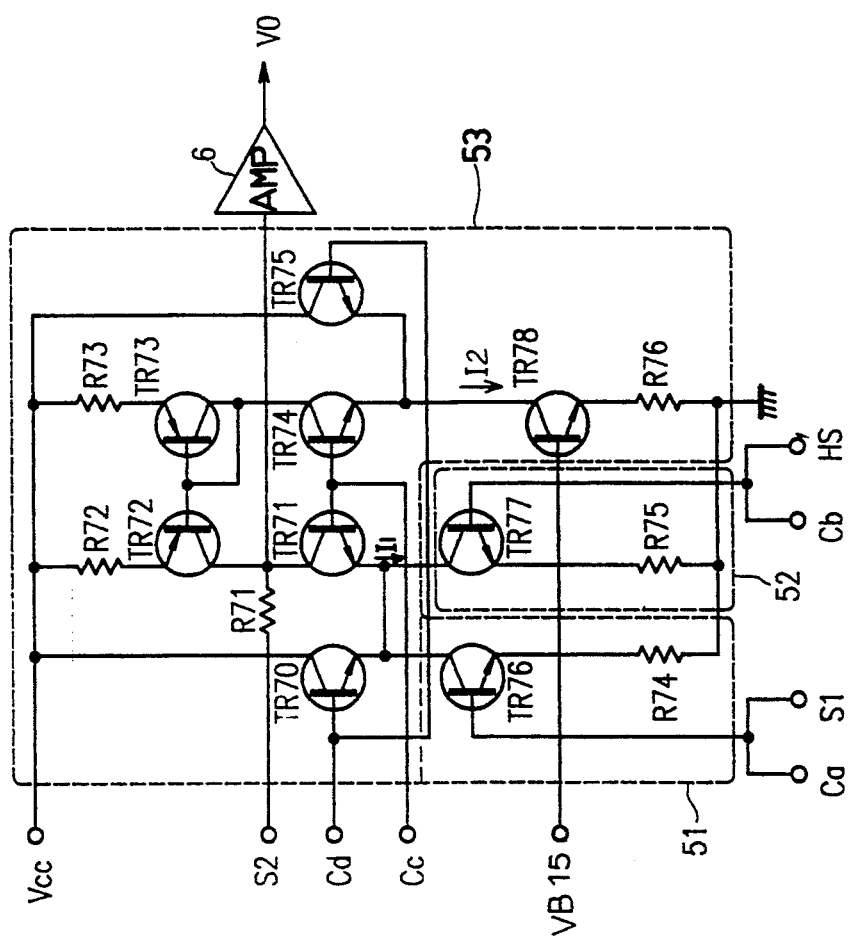

PICTURE CONTROL SYSTEM FOR VIDEO CASSETTE TAPE RECORDER

BACKGROUND OF THE INVENTION

1. Field of the Invention

The present invention relates to a video cassette tape recorder of high picture quality, and more particularly to a picture control system for use in a video cassette tape recorder which can reproduce a precise picture suitable for a high resolution by simultaneously executing hard-control and soft-control of a reproduction luminance signal by separate circuits.

2. Description of the Prior Art

Various types of picture control systems for use in a video cassette tape recorder are well known in the art. One conventional picture control system for use in a video cassette tape recorder is illustrated in FIG. 1. As shown in FIG. 1, the conventional picture control system comprises a luminance signal input section 101, including a resistor R101 and transistors TR101-TR103, for amplifying and outputting a reproduction luminance signal YS at a predetermined level, a low-pass filter 102, including of a resistor R102 and a capacitor C101, for filtering an output of the luminance signal input section 101, a differential amplifier 103, including resistors R103-R111 and transistors TR104-TR111, for differential-amplifying and adding together the reproduction luminance signal 45 of the luminance signal input section 101 and 94 output signal of the low-pass filter 102, a bias varying section 104, including of a resistor R112, a capacitor C102 and a variable resistor VR101, for varying a bias voltage of the differential amplifier 103, and a signal compensating section 105, including resistors R113-R119 and transistors TR112-TR120, for adding the output signal of an differential amplifier 103 to the reproduction luminance signal YS and then amplifying and outputting the added signal. In FIG. 1, references BV1-BV4 denote bias voltages which are determined by power supply Vcc and value of each of the circuit elements.

Such a conventional picture control system operates as follows. When a power Vcc is supplied and bias voltages BV1-BV4 are supplied, transistors TR101, TR113 and TR115 become conductive, respectively, by the bias voltages BV1, BV2 and BV3 and transistors TR103, TR110, TR111, TR116, TR117 and TR120 are also turned on by the bias voltage BV4. Furthermore, the power Vcc is divided at the resistors R103 and R104 and applied to bases of the transistors TR104 and TR107 via the resistor R105 as a bias voltage and also applied to bases of the transistors TR105 and TR106 via the resistor R106 as a bias voltage. At this moment, the bias voltage which is applied to the transistors TR105 and TR106 is varied in response to the variable resistor VR101 of the bias varying section 104.

Under these circumstances, when a reproduction luminance signal YS as shown in FIG. 2A is inputted, the reproduction luminance signal YS is applied to a base of the transistor TR102 of the luminance signal input section 101, thereby a signal in proportion to the reproduction luminance signal YS is outputted from an emitter of the transistor TR102. And, the outputted signal is applied to a base of the transistor TR109 via a resistor R108 of the differential amplifier 103 and filtered at the low-pass filter 102, as shown in FIG. 2B, and then applied to the base of the transistor TR109. Accordingly, the transistors TR108 and TR109 are differential-amplified so that only a high frequency component is output to their collectors as a current, and this output current is properly amplified at the transistors TR104 and TR107 and then output to an output terminal VO1. Meanwhile, the bias voltage which is applied to bases of the transistors TR105 and TR106 is varied in response to the change of the variable resistor VR101 of the bias varying section 104, and at this moment, when the bias voltage is so adjusted as to execute a hard-control operation, a signal having the waveform of FIG. 2C is output from the output terminal VO1.

The signal outputted as above is applied to a base of the transistor TR112 and output through its emitter and then applied to an emitter of the transistor TR115 through a resistor R113. And, at this moment, the reproduction luminance signal YS, as shown in FIG. 2A, is applied to a base of the transistor TR114 and output through its emitter and then applied to an emitter of the transistor TR115 via a resistor R115. As a result, since the signal of the output terminal VO1, as shown in FIG. 2C, is added to the reproduction luminance signal YS, as shown in FIG. 2A, a signal, as shown in FIG. 2D, is output. That is, the reproduction luminance signal YS is outputted in a state that its leading edge and trailing edge are emphasized.

In the meantime, under the state that the bias voltage which is applied to the bases of the transistors TR105 and TR106 is so adjusted as to execute the soft-control operation, a signal having the waveform of FIG. 2E is outputted from the output terminal VO1, and since this signal is added to the reproduction luminance signal YS, as shown in FIG. 2A, at the signal compensating section 105, a signal, as shown in FIG. 2F, is outputted from the output terminal VO, and thus the reproduction signal is soft-compensated and then outputted.

In such a conventional system, since the hard-control or soft-control operation is carried out by the change of the bias varying section and compensation is executed only in one direction at the edge portions of the reproduction luminance signal at the time of hard-control or soft control, there exists a limit to the compensation of the reproduction luminance signal and also it is difficult to obtain a precise picture control.

SUMMARY OF THE INVENTION

Accordingly, it is an object of the present invention to provide a picture control system for use in a video cassette tape recorder which is capable of obtaining a precise picture control by executing the hard-control and soft-control by separate circuits.

Another object of the present invention is to provide a picture control system which compensates a reproduction luminance signal by compensating the reproduction luminance signal at its edge portions in both directions at the time of hard-control and soft-control operations.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a picture control system for use in a video cassette tape recorder which includes picture control signal generating section for generating a signal combination control signal in response to a control voltage input from the outside, a hard-controlling section for compensating high frequency component of a reproduction luminance signal, a delaying section for delaying and outputting the reproduction luminance signal at predetermined time, a soft-controlling section for attenuating luminance signal which is outputted from the delaying section, a signal combining section for combining the output signal of the hard-controlling section and the output signal of the soft-controlling section with the output signal of the delaying section in response to the control signal of the picture control signal generating section, and an amplifying section for amplifying the output signal of the signal combining section at a predetermined level.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIGS. 2A to 2F are waveform views of each section of FIG. 1;

FIG. 3 is a block diagram of a picture control system for use in a video cassette tape recorder according to the present invention;

FIG. 7 is a detailed circuit diagram of a signal combination section of FIG. 3; and FIGS. 8A to 8D are waveform views of each section of FIG. 3.

DESCRIPTION OF THE PREFERRED EMBODIMENTS

Figure 1:
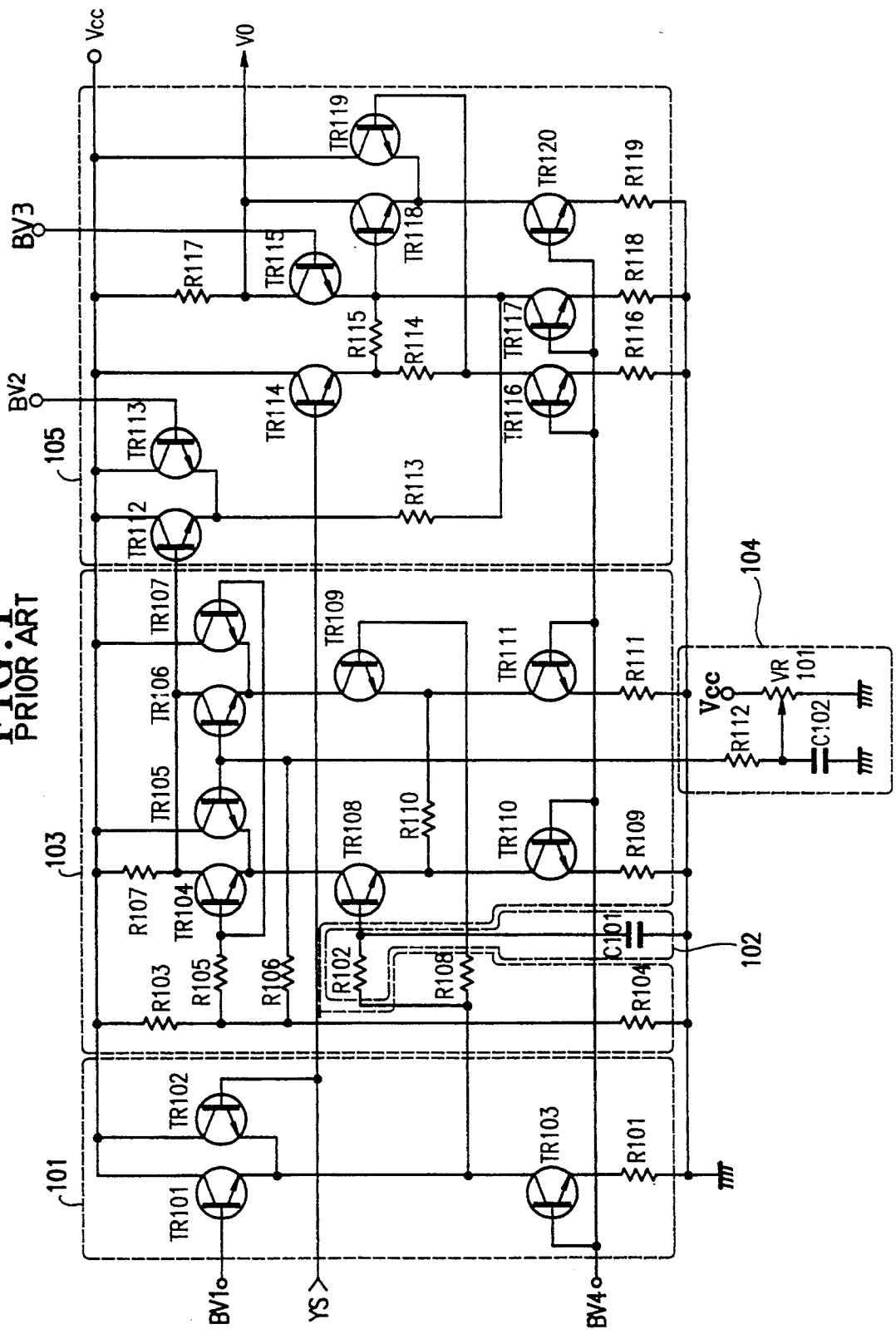
FIG. 1 is a circuit diagram of a conventional picture control system for use in a video cassette tape recorder.

Referring now in detail to the drawings for the purpose of illustrating preferred embodiments of the present invention, the picture control system for use in a VCR as shown in FIG. 3, which comprises a picture control signal generating section 1 which is driven in response to a control voltage CIN and generates signal combination control signals ca-cd, a hard-control section 2 which emphasizes a high frequency component at the edge portion of an input reproduction luminance signal YS, a delay section 3 which outputs the input reproduction luminance signal YS after delaying the signal for a predetermined time, a soft-control section 4 which attenuates a high frequency component at the edge portion of an output signal S2 which is output from the delay section 3, a signal combination section 5 which ANDs an output signal S1 of the soft-control section 4 with the signal combination control signals Ca and Cb of the picture control signal generating section 1, respectively, and adds the ANDed two signals to the output signal S2 of the delay section 3 by means of the signal combination control signals Cc and Cd of the picture control signal generating section 1, and an amplifier 6 which amplifies the output signal of the signal combination section 5.

Figure 4:
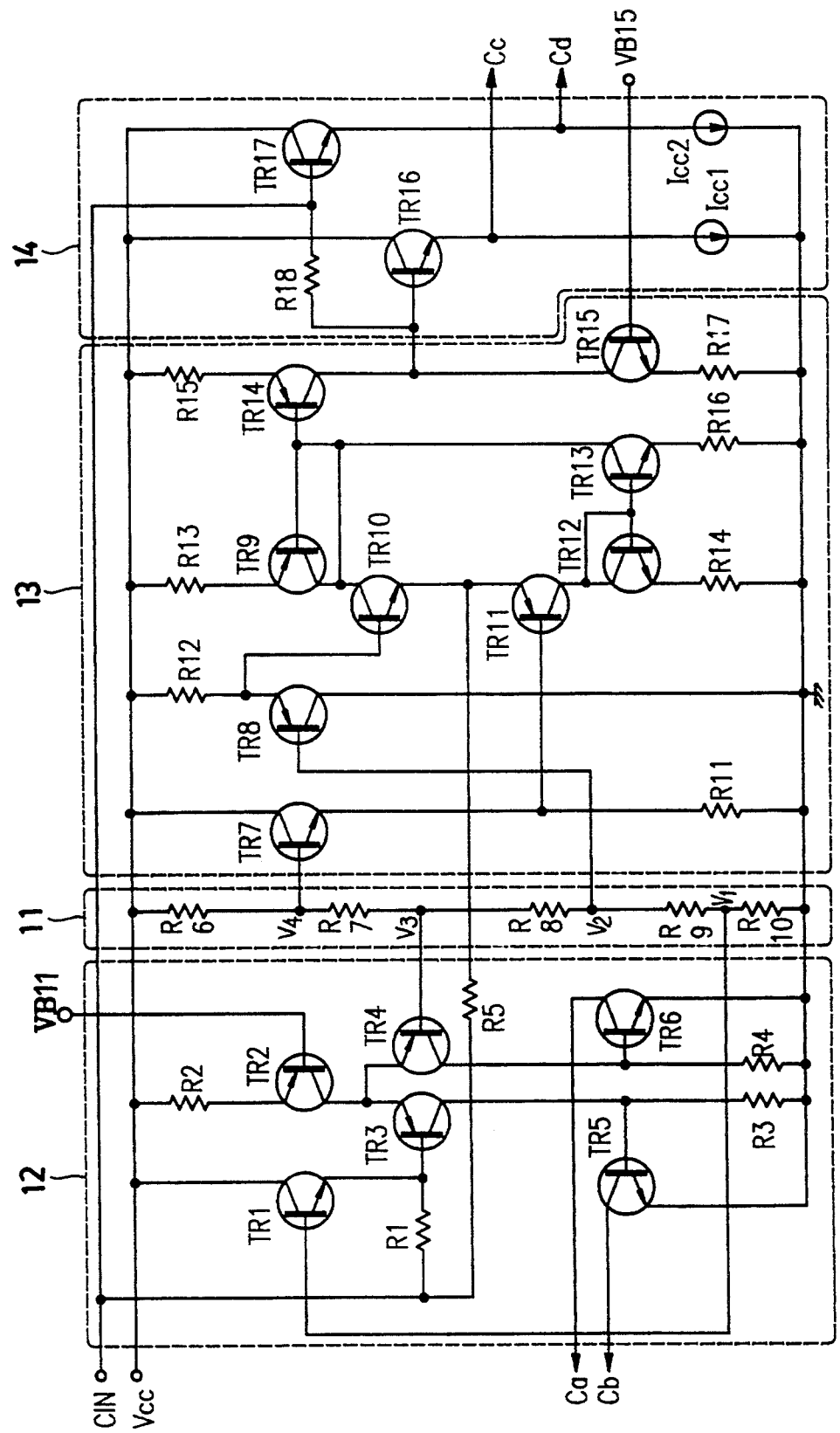
FIG. 4 is a detailed circuit diagram of a picture control signal generating section of FIG. 3.

FIG. 4 is a detailed circuit diagram of the picture control signal generating section of FIG. 3. As shown in FIG. 4, the picture control signal generating section comprises a reference voltage generating section 11, including of resistors R6 to R10, for generating first to fourth reference voltages V1 to V4, a first control signal generating section 12, including resistors R1 to R4 and transistors TR1 to TR6, for comparing a control voltage CIN with reference voltages V1 and V3 of the reference voltage generating section 11 and outputting signal combination control signals Ca and Cb, a comparing section 13, including resistors R11 to R17 and transistors TR7 to TR15, for comparing the control voltage CIN with reference voltages V2 and V4 of the reference voltage generating section 11 and outputting the compared resultant signal, and a second control signal generating section 14, including resistor R18 and transistors TR16 and TR17, for generating signal combination control signals Cc and Cd in response to the compared resultant signal of the comparing section 13 and the control voltage CIN. In the drawing, references VB11 and VB15 denote bias voltages, Vcc a power voltage, and Icc1 and Icc2 current sources.

Figure 5:
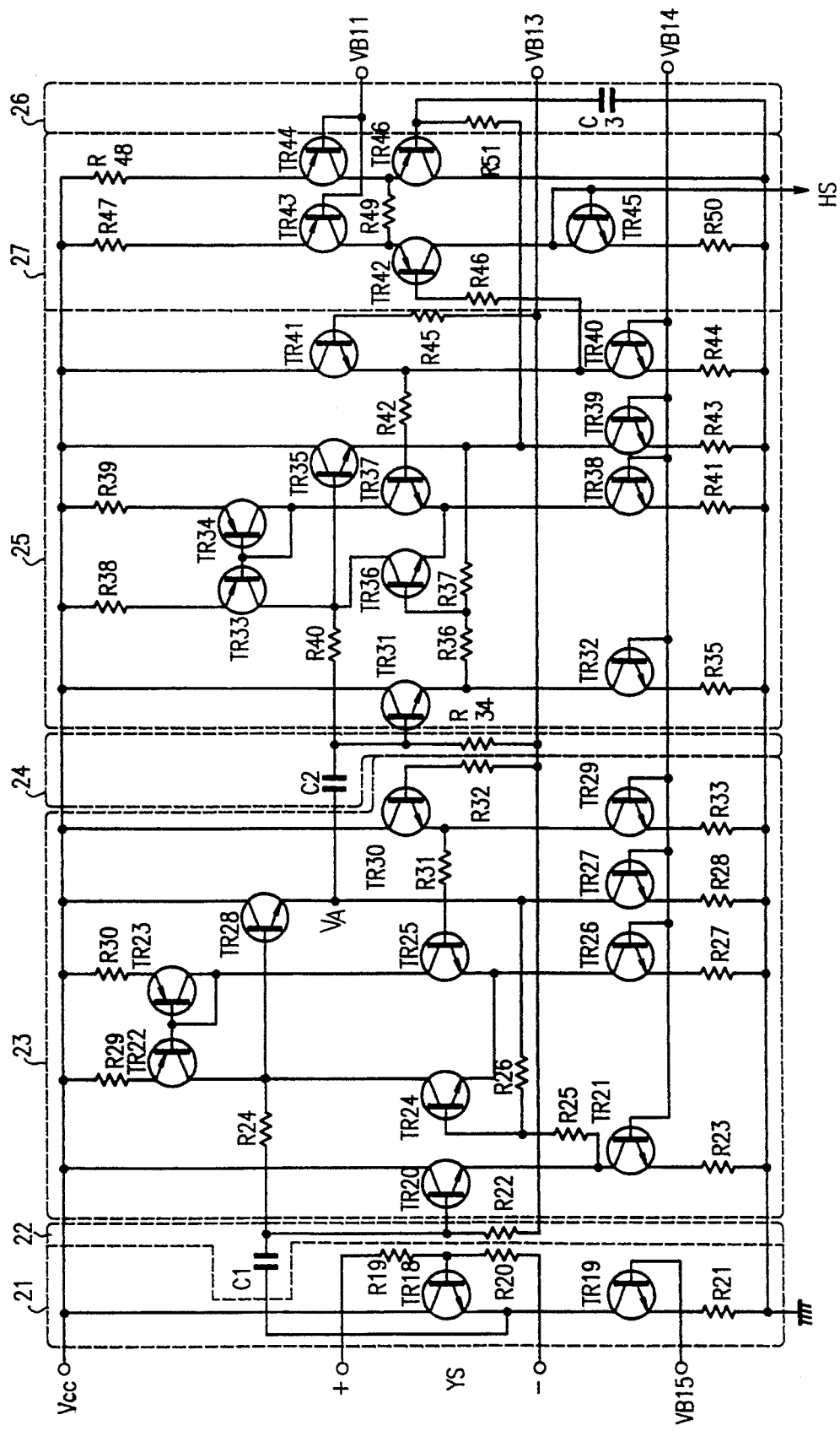
FIG. 5 is a detailed circuit diagram of a hard-control section of FIG. 3.

FIG. 5 is a detailed circuit diagram of the hard-controlling section of FIG. 3. As shown in FIG. 5, the hard-controlling section 2 comprises a luminance signal input section 21, including resistors R19 to R21 and transistors TR18 and TR19, for adjusting the level of the reproduction luminance signal YS, a first high-pass filter 22, including a capacitor C1 and a resistor R22, for allowing the high-band component of the output signals of the luminance signal input section 21 to pass therethrough, a first inverting and amplifying section 23, including resistors R23 to R33 and transistors TR21 to TR30, for inverting and amplifying the output signal of the high-pass filter 22, a second high-pass filter 24, including a capacitor C2 and a resistor R34, for allowing the high-band component of the output signals of the first inverting and amplifying section 23 to pass therethrough, a second inverting and amplifying section 25, including resistors R35 to R45 and transistors TR31 to TR41, for inverting and amplifying the output signal of the second high-pass filter 24, a lowpass filter 26, including resistor R51 and a capacitor C3, for allowing the low-band component of the output signals of the second inverting and amplifying section 24 to pass therethrough, and an amplifying section 27 including resistors R46 to R50 R52 to R46 for amplifying the output signal of the low-pass filter 26. In the drawing, reference numerals VB11, VB13, VB14 and VB15 are bias voltages.

Figure 6:
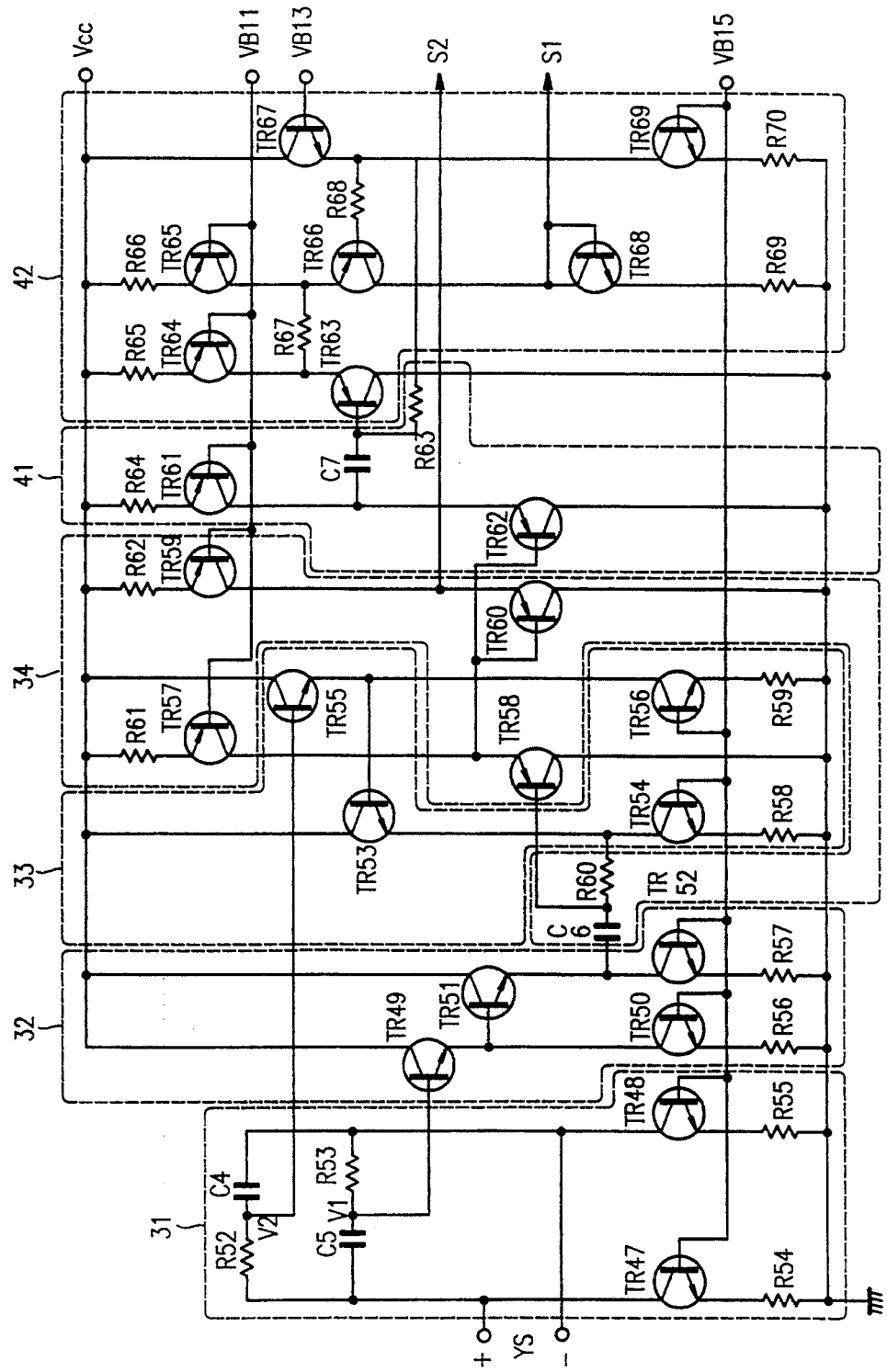
FIG. 6 is a detailed circuit diagram of a delay section and a soft-control section of FIG. 3.

FIG. 6 is a detailed circuit diagram of the delaying section and the soft-controlling section of FIG. 3, As shown in FIG. 6, the delaying section 3 comprises a RC delaying section 31, including of resistors R52 to R55, capacitors C4 and C5, and transistors TR47 and TR48, for delaying positive and negative signals of the reproduction luminance signal YS, respectively, a first amplifier 32, including transistors TR49 to TR52 and resistor R56 and R57, for amplifying the negative delay signal of the RC delaying section 31, a second amplifier 33, including transistors TR53 to TR56 and resistors R58 and R59, for delaying the positive delay signal of the RC delaying section 31, and an output delaying section 34, including a capacitor C6, resistors R60 to R63, and transistors TR57 to TR60, for combining and outputting the output signals of the first and second amplifiers 32 and 33.

The soft-controlling section 4 comprises a low-pass filter 41, including resistors R63 and R64, a capacitor C7 and transistors TR61 and TR62, for allowing the low-band signal of the output signals of the output delaying section 34 to pass there through, and a soft-compensating output section 42, including resistors R65 to R70 and transistors TR64 to TR69, for amplifying and outputting the output signal of the low-pass filter 41. In the drawing, VB11, VB13 and VB15 are bias voltages.

FIG. 7 is a detailed circuit diagram of the signal combining section of FIG. 3. As shown in FIG. 7, the signal combining section comprises an ANDing section 51, including a transistor TR76 and a resistor R74, for ANDing the signal combination control signal Ca of the picture control signal generating section 1 with an output signal S1 of the soft-controlling section 4, an ANDing section 52, including a transistor TR77 and a resistor R76, for ANDing the signal combination control signal Cb of the picture control signal generating section 1 with an output signal HS of the hard-controlling section 2, and a combining section 53, including resistors R71 to R73 and R76 and transistors TR70 to TR74 and TR78, for subtracting the output signals of the ANDing sections 51 and 52 from the output signal S2 of the delaying section 3 and combining the subtracted signals upon the control of the signal combination control signals Cc and Cd of the picture control signal generating section 1. In the drawing, reference VB15 is a bias voltage.

The picture control system of the present invention operates as follows:

When a power supply voltage Vcc is applied to the picture control signal generating section 1, the power supply voltage Vcc is divided by resistors R6 to R10 of the reference voltage generating section 11, thereby causing the reference voltage generating section 11 to generate reference voltages V1 to V4. At this moment, when bias voltages VB11 and VB15 are applied, transistors TR2 and TR5 become conductive.

Under these conditions, when a control voltage CIN is applied, the control voltage CIN is applied to an emitter of the transistor TR1 and a base of the transistor TR3 via the resistor R1. Furthermore, the transistor TR1 becomes conductive by the reference voltage V1 so that its emitter output voltage is applied to a base of the transistor TR3. At this moment, in case that the control voltage CIN is lower than the reference voltage V1, the emitter output voltage of the transistor TR1 flows through the resistor R1, so that the transistor TR3 becomes conductive and the transistor TR4 is turned off. As the turn-on of the transistor TR3 causes the transistor TR5 to become conductive, a signal combination control signal Cb of low level is output, and the turn-off of the transistor TR4 causes the transistor TR7 to be turned off so that the signal combination control signal Ca is in an open state.

Furthermore, the control voltage CIN is applied to emitters of the transistors TR10 and TR11 via the resistor R5 and the transistor TR7 becomes conductive by the reference voltage V4 so that its emitter output voltage is applied to a base of the transistor TR11. At this moment, since the control voltage CIN is lower than the reference voltage V1, the transistor TR8 is turned off, thereby causing the transistor TR10 to become conductive and the transistor TR11 to be turned off.

Accordingly, the turn-off of the transistor TR11 causes the transistors TR12 and TR13 to be turned off and the turn-on of the transistor TR10 causes the transistors TR9 and TR14 to be conductive. That is, at this moment, the collector current of the transistor TR9 comes to $$\frac{V1 - CIN}{R5},$$

and the collector current of the transistor TR14 is also identical to that of the transistor TR9. This collector current is applied to base of the transistor TR16 and at the same time passes through the transistor TR15 and the resistor R17. As a result, a current which is obtained by subtracting the collector current of the transistor TR15 from the collector current of the transistor TR14 flows through the resistor R18, and thus the voltage Vc of the signal combination control signal Cc is determined by: $Vc = CIN + R18 \cdot IR18 - V_{BE}$. At this moment, the transistor TR17 is turned off by the low control voltage CIN, causing the signal combination control signal Cc to be outputted at low level.

Meanwhile, in case that the control voltage CIN is higher than the reference voltage V4 of the reference voltage generating section 11, transistors TR3 and TR5 of the first control signal generating section 12 are turned off so that the signal combination control signal Cb is in an open-state, and transistors TR4 and TR6 become conductive so that the signal combination control signal Ca is output at low level. And, at this moment, the transistor TR10 is turned off and the transistor TR11 is turned on by the control voltage CIN. The turn-on of the transistor TR11 causes the transistors TR12 and TR13 to be conductive, thereby transistors TR9 and TR14 become conductive. Accordingly, the collector current of the transistor TR9 comes to $$\frac{CIN - V4}{R5},$$

and thus the voltage Vc of the signal combination control signal Cc which is outputted from the second control signal generating section 14 is determined by: $Vc = CIN + R18 \cdot IR18 - V_{BE}$.

On the other hand, when the control voltage CIN is higher than the reference voltage V1 of the reference voltage generating section 11 but lower than the reference voltage V4, both the transistors TR10 and TR11 of the comparing section 13 are turned off by the control voltage CIN so that transistors TR9, TR12 and TR14 are turned off. As a result, bias voltages of the transistors TR16 and TR17 are applied constantly by the control voltage CIN, thereby the voltages of the signal combination control signals Cc and Cd which are outputted from the second control generating section 14 become identical to each other.

The signal combination control signals Ca and Cb which are outputted from the first control signal generating section 12 are applied, respectively, to ANDing sections 51 and 52 of the signal combining section 5, and the signal combination control signals Cc and Cd which are outputted from the second control signal generating section 14 are applied to the combining section 53 of the signal combining section 5.

Meanwhile, when bias voltages VB11, VB13, VB14 and VB15 are applied to the hard-controlling section 2 of FIG. 5, the bias voltage VB11 is applied to bases of the transistors TR43 and TR44, the bias voltage VB13 to bases of the transistors TR20, TR30, TR31 and TR41, the bias voltage BV14 to bases of the transistors TR21, TR26, TR27, TR29, TR32, TR38, TR39 and TR40, and the bias voltage VB15 to a base of the transistor TR19.

Under these circumstances, when a reproduction luminance signal YS, as shown in FIG. 8A, is input, the reproduction luminance signal YS is adjusted at a predetermined level by the luminance signal input section 21 of the hard-controlling section 2, and only a high-band component signal of the output signals of the luminance signal input section 21 passes through the capacitor C1 and resistor R22 of the high-pass filter 22 is inverted and amplified at the first inverting and amplifying section 23 and output as shown in FIG. 8B. At this moment, the relationship between the signal voltage Vin input to the high-pass filter 22 and the signal voltage Vout output from the first inverting and amplifying section 23 can be expressed by the following equation:

$$\frac{Vout}{Vin} = \frac{-S \cdot \frac{R26}{R24 \cdot R26}}{S + \frac{R24 \cdot R25 + R24 \cdot R22 + R25 \cdot R26 + R26 \cdot R22 + R22 \cdot R25}{C1(R24 + R26) \cdot R25 \cdot R22}}$$

The high-band component signal out of the signals output from the first inverting and amplifying section 23 passes again through the second high-pass filter 24, and thereafter inverted and amplified at the second inverting and amplifying section 25. At this time, the characteristics of the second high-pass filter 24 and second inverting and amplifying section 25 are identical to that of the first high-pass filter 22 and first inverting and amplifying section 25.

As described above, only the low-band component signal out of the signal out of the signals output from the second inverting and amplifying section 25 passes through the resistor R51 and capacitor C3 of the low-pass filter 26, and at this moment the passing frequency fc of the low-pass filter 26 comes to:

$$fc = \frac{1}{2\pi \cdot R51 \cdot C3}$$

The signals output from the low-pass filter 26 as above are amplified and output from the amplifying section 27. As a result, the signal HS which is outputted from the amplifying section 27 is applied to the ANDing section 52 of the signal combining section 5, as shown in FIG. 8C.

On the other hand, when bias voltages VB11, VB13 and VB15 are applied to the delaying section 3 and the soft-controlling section 4 of FIG. 6, the bias voltage VB11 is applied to bases of the transistors TR57, TR59, TR61, TR64 and TR65, the bias voltage VB13 to a base of the transistor TR67, and the bias voltage VB15 to bases of the transistors TR47, TR48, TR50, TR52, TR54, TR56 and TR69.

Under these circumstances, a reproduction luminance signal YS, as shown in FIG. 8A, is input, positive and negative signals of the reproduction luminance signal YS are output after delayed at the resistors R52 and R53 and capacitors C4 and C5 of the RC delaying section 31 at a predetermined time. Assuming that the reproduction luminance signal YS is Sin wt, the negative delay signal V1 and the positive delay signal V2 of the RC delaying section 31 can be expressed by the following equations:

$$V1 = \frac{fc}{\sqrt{f^2 + fc^2}} \operatorname{Sin}(wt + \theta)$$

-continued $$V2 = \frac{fc}{\sqrt{f^2 + fc^2}} \operatorname{Sin}(wt + 90° + \theta) = \frac{f}{\sqrt{f^2 + fc^2}} \operatorname{Cos}(wt + \theta)$$

wherein, $$\theta = -\tan^{-1}\frac{f}{fc}$$

The negative delay signal V1 which is outputted from the RC delaying section 31 is amplified at the first amplifier 32 and the positive delaying signal V2 is amplified at the second amplifier 33. And, the output signals of the first and second amplifiers 32 and 33 are added together through the capacitor C6 and the resistor R60 of the output delay section 34 and then amplified at the transistors TR57 to TR60. As a result, the output signal S2 of the output delay section 33 recognizes that the reproduction luminance signal (YS=Sin wt) is delayed as the following equation:

$$S2 = \frac{f}{\sqrt{f^2 + fc^2}} \operatorname{Sin}(wt + 3\theta)$$

The output signal S2 of the output delay section 33 is applied to the combining section 53 of the signal combining section 5, and a low-band component signal of the output signal S2 of the output delay section 33 is filtered at the resistor R63 and capacitor C7 of the low-pass filter 41 of the soft controlling section 4 and then amplified by the soft compensating output section 42 outputs a signal S1, as shown in FIG. 8D, and the output signal S1 is applied to the ANDing section 51 of the signal combining section 5.

The output signal S1 of the soft-controlling section 4 and the output signal HS of the hard-controlling section 2 which have been outputted as above described, are selected at the ANDing sections 51 and 52 by the signal combination control signals Ca and Cb of the picture control signal generating section 1, and when the transistor collector currents of the combining section 53 are varied by the selected signal, the output signal S2 of the delaying section 3 is converted into a voltage through the resistor R71 and then outputted through the amplifying section 6.

Furthermore, since the direct currents of the transistors TR71 and TR74, TR70 and TR75 of the combining section 53 by the signal combination control signals Cc and Cd of the picture control signal generating section is varied, the current transmitted to a collector of the transistor TR71 is also varied.

In case that the output signal S1 of the soft-controlling section 4 and the output signal HS of the hard-controlling section 2 are selected at the ANDing sections 51 and 52 by the signal combination control signals Ca and Cb and thus a signal which is applied to emitters of the transistors TR70 and TR71 of the combining section 53 is $V_E$, the collector currents I1 and I2 of the transistors TR76 and TR77, and TR78 become identical to each other, and at this moment, assuming that the voltage of the output signal S2 of the delaying section 3 is VS2, the voltage of the final output signal VO can be expressed as the following equation:

$$VO = VS2 - \frac{I1}{1 + \exp\left(\frac{Cd - Cc}{V_T}\right)} \cdot \frac{V_E \cdot R71}{R74 + re}$$

That is, when the signal combination control signal Cb of low level and the signal combination control signal Ca in an open state are output from the first control signal generating section 12 due to the fact that the control voltage CIN is lower than the reference voltage V1 of the reference voltage generating section 11, as described above, the transistor TR77 of the ANDing section 52 is kept turned off by the signal combination control signal Cb of low level so that the output signal HS of the hard-controlling section 2 is not selected, and the output signal S1 of the soft-controlling section 4 is selected at the transistor TR76 of the ANDing section 51 by the signal combination control signal Ca in an open-state and then outputted through a collector of the transistor TR76. At this moment, assuming that the signal voltage selected and outputted at the ANDing section 51 is VS1, the voltage of the final output signal VO can be expressed as following equation:

$$VO = VS2 - \frac{I1}{1 + \exp\left(\frac{Cd - Cc}{V_T}\right)} \cdot \frac{R71 \cdot S1}{R74 + re}$$

Furthermore, the signal combination control signal Ca of low level and the signal combination control signal Cb in an open-state are outputted at the first control signal generating section 12 due to the fact that the control voltage CIN is higher than the reference voltage V4 of the reference voltage generating section 11, the output signal HS of the hard-controlling section 2 is selected at the transistor TR77 of the ANDing section 52 by the signal combination control signal Cb in an open-state and then output through a collector of the transistor TR77. At this moment, assuming that the signal voltage which is selected and output at the ANDing section 52 is $V_H$, the voltage of the final output signal VO can be expressed as following equation:

$$VO = VS2 - \frac{I1}{1 + \exp\left(\frac{Cd - Cc}{V_T}\right)} \cdot \frac{R71 \cdot V_H}{R74 + re}$$

Furthermore, in case that the control voltage CIN is higher than the reference voltage V1 of the reference voltage generating section 11, but lower than the reference voltage V4, the final output voltage VO can be expressed as following equations according as to whether the control voltage CIN is over the reference voltage V3:

VO=VS2−KVS1; below the reference voltage V3
VO=VS2−KVH1; over the reference voltage V3
wherein, K is a constant And, at this moment, the signal voltage $V_E$ selected at the ANDing sections 51 and 52 comes to the following equation:

$$V_E = |VS1 - V_H|$$

As described above in detail, the present invention provides the effect that it is possible to ensure the compensation of reproduction luminance signal because the reproduction luminance signal passes through in two-step high-pass filters to obtain a hard compensating signal, the reproduction luminance signal is delayed at a predetermined time and then passes through low-pass filters to obtain a soft-compensating signal, and the hard compensating signal and the soft compensating signal are combined with the delayed reproduction luminance signal so that the edge portions of the reproduction luminance signal can be compensated in both directions. And, the present invention also provides the effect that it is possible to obtain a precise picture control so that the picture control system of the present invention is applicable to a high picture quality video cassette tape recorder.

The invention being thus described, it will be obvious that the same may be varied in many ways, Such variations are not to be regarded as a departure from the spirit and scope of the invention, and all such modifications as would be obvious to one skilled in the art are intended to be included in the scope of the following claims.

What is claimed is:

1. A picture control system for a video cassette tape recorder, comprising:
    picture control signal generating means for generating a signal combination control signal upon receipt of a control voltage;
    hard-controlling means for filtering a high-band component of a reproduction luminance signal and outputting a hard-compensating signal;
    means for delaying said reproduction luminance signal for a predetermined time;
    soft-controlling means for filtering a low-band component of the delayed reproduction luminance signal and outputting a soft-compensating signal;
    signal selecting means for selecting the hard-compensating signal of said hard-controlling means and the soft-compensating signal of said soft-controlling means in response to the signal combination control signal of said picture control signal generating means; and, signal combining means for combining the selected signal output from the signal selecting means with the delayed reproduction luminance signal output from said delaying means.

2. The system of claim 1, wherein said picture control signal generating means includes,
    reference voltage generating means for generating first and second reference voltages;
    first control signal generating means for generating first and second signal combination control signals for selecting the hard-compensating signal of said hard-controlling means and the soft compensating signal of said soft-controlling means by comparing the control voltage with the first and second reference voltages of said reference voltage generating means; and
    second control signal generating means for generating third and fourth signal combination control signals for controlling the signal combination of said signal combining means.

3. The system of claim 1, wherein said hard-controlling means includes,
    luminance signal input means for receiving the reproduction luminance signal;

first high-pass filtering means for filtering a high-band component of the reproduction luminance signal;

first inverting and amplifying means for inverting and amplifying an output of said first high-pass filtering means;

second high-pass filtering means for filtering a high-band component of a signal output from said first inverting and amplifying means;

second inverting and amplifying means for inverting and amplifying an output of said second high-pass filtering means;

low-pass filtering means for filtering a low-band component of an output of said second inverting and amplifying means; and means for amplifying an output of said low-pass filtering means.

4. The system of claim 1, wherein said delaying means includes,

RC delaying means for delaying positive and negative signals of the reproduction luminance signal;

first and second amplifying means for amplifying the positive and negative delay signals of said RC delaying means, respectively; and output delaying means for combining and outputting output signals of said first and second amplifying means.

5. The system of claim 1, wherein said soft-controlling means includes, low-pass filtering means for filtering a low-band component of the delayed reproduction luminance signal; and soft-compensating and outputting means for amplifying an output of said low-pass filtering means.

6. The system of claim 1, wherein said signal selecting means includes, first and second ANDing means for selecting the soft compensating signal of said soft-controlling means and hard compensating signal of said hard-controlling means, respectively, in response to the signal combination control signal from said picture control signal generating means; and wherein said signal combining means includes combining means for subtracting signals selected by said first and second ANDing means from an output of said delaying means according to the signal combination control signal of said picture control signal generating means.

7. The system of claim 1, said picture control system further comprising an amplifier for amplifying an output of said signal combining means.

* * * * *